CONNECTING DEVICE FOR PRIVATE AUTOMATIC BRANCH EXCHANGES

INVENTORS
NILS EMIL NILSSON
GUSTAV OSCAR RODNERT
JOHN CARL HAROLD BJÖRK
BY [signature]
ATTORNEY INVENTORS
NILS EMIL NILSSON
GUSTAV OSCAR RODNERT
JOHN CARL HAROLD BJÖRK
BY [signature]
ATTORNEY 3,065,305
Patented Nov. 20, 1962

3,065,305

CONNECTING DEVICE FOR PRIVATE AUTOMATIC BRANCH EXCHANGES

Nils Emil Nilsson, Stockholm, Gustav Oscar Rodnert, Hagersten, and John Carl Harold Bjork, Stockholm, Sweden, assignors to Telefonaktiebolaget L M Ericsson, Stockholm, Sweden, a corporation of Sweden Filed July 8, 1957, Ser. No. 670,410
Claims priority, application Sweden July 26, 1956
3 Claims. (Cl. 179—16)

This patent application relates to signal transmission in private automatic branch exchanges provided with main lines and subscriber's lines, in which exchanges voice frequency signals are sent from senders in at least some subscriber's instruments to receivers in the telephone exchange and through the main lines to receivers in a main exchange. The sender comprises an oscillating circuit, the frequency of which is set by means of a number of keys in the subscriber's instrument. The receivers are voice frequency receivers located in registers pertaining to the private automatic branch exchange or to the main exchange. In order to avoid disturbances from the microphone of the subscriber's instrument during the emission of voice frequency signals the operator's set and the voice frequency sender of the subscriber's instrument are connected and disconnected alternately by means of rectifiers and turning of the current direction in the subscriber's line. After a connection has been established there is however no voice frequency receiver connected in the communication and this invention has for a purpose to facilitate signal transmission from a subscriber's instrument when connected in communication with a main line in order to disconnect the main line for waiting during a local call from the subscriber's instrument for eventual transfer of the communication to another subscriber's line.

It is known by the Swedish Patent No. 85,882 in telephone exchanges with telephone instruments provided with a dial to operate—by means of an interruption of short duration, for example an impulse from the dial—relays in the relay set of the main line in such a way, that call-back may be made without disconnection of the connection over the main exchange. In a subscriber's instrument with a key set it is possible to use a break contact on at least one of the push buttons and to produce, by means of a short, easily learnt pushing of the push button, an interruption of suitable duration. This involves however particular instructions as to the handling of the instrument and occasions a certain insecurity and it is also necessary that the release of a call occurs with a considerable delay. Also mechanical devices are thinkable but they cause costs, demands for space and a reduced reliability of operation.

The purpose of the invention is achieved by connecting means in the branch exchange feeding the subscriber's line with different current direction when the line is connected for conversation and when the line is connected for digit signal sending. Each subscriber's instrument comprises a microphone and a voice frequency digit signal sender, a rectifier blocking the microphone when the line is connected for digit singal sending and a break contact actuated by a key connected in series with the microphone and said rectifier, and a hold circuit including a second rectifier blocking the hold circuit when the line is connected for conversation. or each main line is provided a separate line terminating in the branch exchange, relay means including at least one feeding relay for current feeding to a subscriber's line connected to the main line, a switching relay connecting the subscriber's line for one or the other current direction and switch means connecting the subscriber's line alternately to the main line and to said separate line. The pressing of the key that actuates the break contact releases the feeding relay whereby the switching relay changes the current direction in the subscriber's line and instrument. As a result, current through the hold circuit causes the switch means to disconnect the main line and to connect the subscriber's line to the separate line for setting up a local call within the branch exchange.

When the local communication is established a transfer of the communication can be arranged in known manner when the subscriber puts down his handset.

The invention will be described more closely below with reference to the annexed drawings, FIGS. 1–2.

Figure 1:
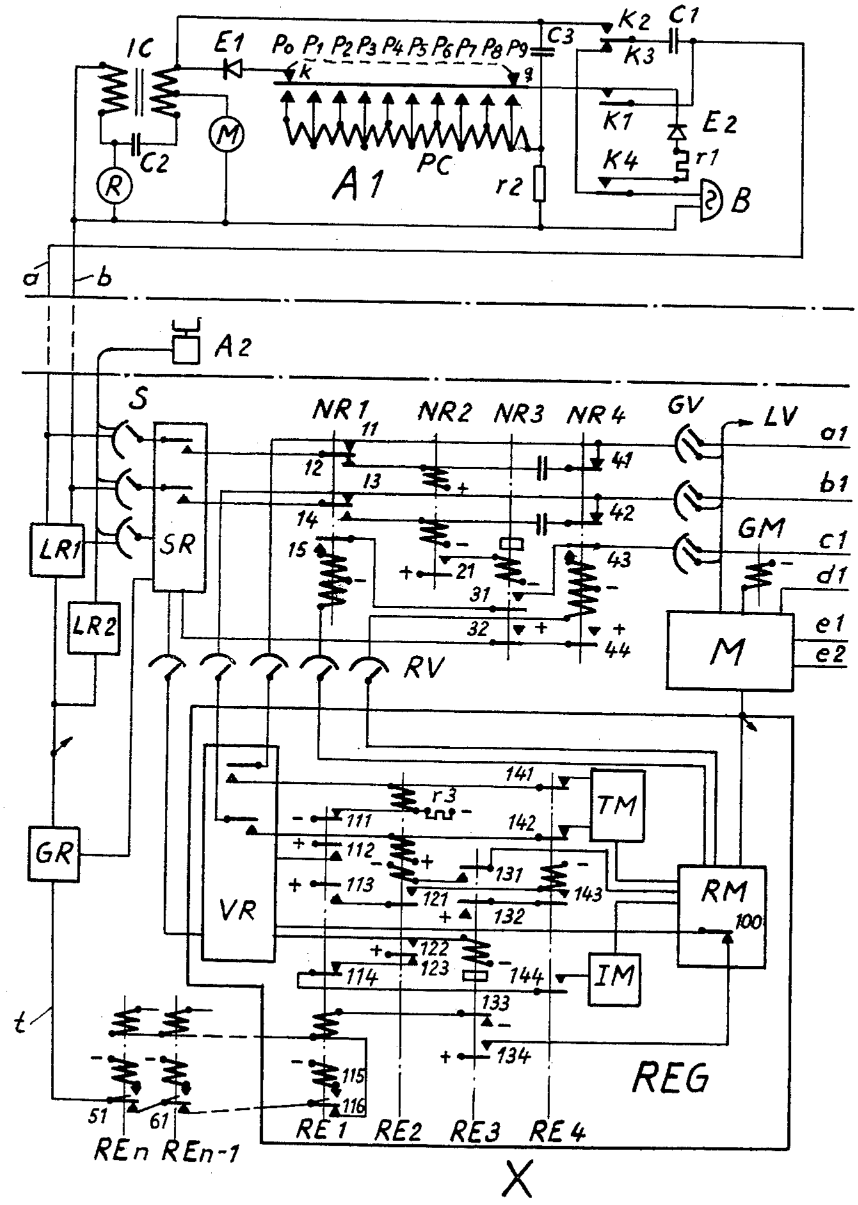
FIG. 1 shows a telephone exchange X with subscriber's instruments A1 and A2.

In FIG. 1 A1 is a subscriber's instrument with devices for voice frequency sending and A2 is a common subscriber's instrument with a dial. The sender in the instrument A1 consists of frequency determining contact devices P0–P9, the inductance coil PC, the condensers C1 and C3 and the resistance *r2*. The contacts P0–P9 are suitably push buttons, at least P0 of said buttons also operating the break contact *k*. The contacts K1—K4 are actuated by the cradle of the instrument and are shown in rest position when the hand microtelephone is put on. The inductance coil IC, the condenser C2, the telephone receiver R and the microphone M constitute the operator's sets of the instrument. The bell B and the condenser C1 are the signalling devices of the instrument. The bell B, the contact K4, the resistance *r1* and the rectifier E2 constitute a holding circuit, which is closed during the sending of voice frequency signals, in this case only numerical signals, from the subscriber's instrument. The inductance from the bell prevents the voice frequency signals from passing over the holding circuit. The subscriber's instrument A1 is over a subscriber's line *a*, *b* connected to a telephone exchange X containing line-finders S with relay sets SR, NR1—NR4, registers REG with register connectors RV and selectors GV for connection of the relay sets SR, NR1—NR4 to a main line HL according to FIG. 2 or to a line selector LV, which is not more closely shown in the drawings as it is unessential to the invention. To each main line HL there pertains a relay set R1—R15 arranged in the telephone exchange. In the telephone exchange there is furthermore a line relay LR1, LR2 for each subscriber's line and group relays GR. The selectors GV and LV are set by means of a marker M which is common to the whole telephone exchange, to which marker the registers REG are connected, one by one. Here it is supposed that ordinary subscriber's instruments A2 with a dial as well as subscriber's instruments A1 with voice frequency senders are connected to the telephone exchange X. Owing to this the registers REG are provided both with impulse receivers IM for dial impulses from the instrument A2 and with voice frequency receivers TM for voice frequency signals from the instrument A1. Both receivers set the registering part RM of the register.

For selection of a free register REG at each call there is provided a relay chain RE1 . . . RE$n-1$, RE$n$ containing a relay for each register. This relay operates a relay set VR, which sets the register connector RV. At calls from the instrument A1 the line loop from the line relay LR1 is closed over the *a*-wire, the contact K1, the break contact *k*, the rectifier E1, the upper right winding of the induction coil IC, the microphone M and the wire *b*. Relays in LR1 and GR are operated and plus connected to the wire *t*. The following circuits are completed: +, the contacts 51, 61 and 116, the upper winding of the relays RE1 . . . RE$n-1$, RE$n$ to minus over the contact 133 in all registers REG. The relay RE1 is here supposed to attract its armature. The contacts 111—116 are actuated. The relay set VR is operated over the contact 112 and the register connector RV selects a free line-finder S. The line-finder S is controlled by a relay set SR and hunts for the calling subscriber's line. Then the relay RE3 is operated by a current impulse from SR through VR. During the make time of the relay RE3 it is tested if the calling subscriber's instrument is equipped for voice frequency sending or not. This occurs through the following circuit: +, the intermediate winding of the relay RE2, VR, RV, the contact 13, S, SR, the *b*-wire, B, K4, *r*1, E2, K1, the *a*-wire, S, SR, the contact 11, RV, VR, the upper winding of the relay RE2, the resistance *r*3, to minus. The relay RE2 is not operated in this circuit, whereas the resistances *r*1 and *r*3 together constitute the greater part of the resistance of the circuit. When the relay RE3 operates, the contacts 131—134 are actuated. The relay RE1 releases its armature and the contact 111 short-circuits the resistance *r*3. Then the relay RE2 is operated before the relay RE3 has time to release. The contacts 121—123 are actuated. The relay RE3 is kept operated over the contact 122. A dialling tone is emitted from the registering part RM of the register over the contact 131 through the lower winding of the relay RE2 and is heard by the one who is calling. The connection over VR, RV, SR and S is held through a circuit over the contacts 134 and 100. By means of the push buttons P0—P9 voice frequency signals are sent, which are received by the voice frequency receiver TM and registered by registering devices RM. This process is more closely described in the Swedish Patent No. 154,618.

If the call had been made from the instrument A2, the relay RE2 would have been operated before the relay RE3, and the relay RE4 becomes energized over the contacts 113 and 121 and is operated. The contacts 141—144 are actuated and the voice frequency receiver TM is disconnected. Instead the impulse receiver IM is connected by the contact 144 being closed. When the relay RE3 is operated, the relay RE4 is kept energized over the contacts 132 and 143, while the relay RE1 releases its armature. The calling person hears a dialling tone and emits impulse series by means of his dial. These are received by the impulse receiver IM through a circuit over the contacts 123, 114 and 144 and the registering device RM is set.

Independent of which person is calling the call may be meant for the main exchange or a subscriber's line within the telephone exchange. When the registering device RM has been set, the register REG is connected to the marker M, which in its turn is set from RM for the selection of a free main line or line selector LV. If the call is intended for a subscriber's line within the telephone exchange, the relay NR1 is operated. The contacts 11—15 are actuated. The relay NR2 is operated through the rectifier E1 in the subscriber's instrument A1. The contact 21 is closed. The relay NR3 operates. The contacts 31—32 are closed. The contacts 11 and 13 release the register REG. The contact 32 holds the connection over the line-finder S. The contact 15 indicates the relay set SR, NR1—NR4, which is to be connected over the selector GV to a line selector LV. The marker selects a free line selector LV, starts the pertaining selector GV and attends to the testing of this selector in a circuit over the contacts 31 and 15 and the upper winding of the relay NR1. The marker also sets the line selector LV, whereupon it is released. The connection over GV and LV is held by means of the circuit over the contact 31.

Figure 2:
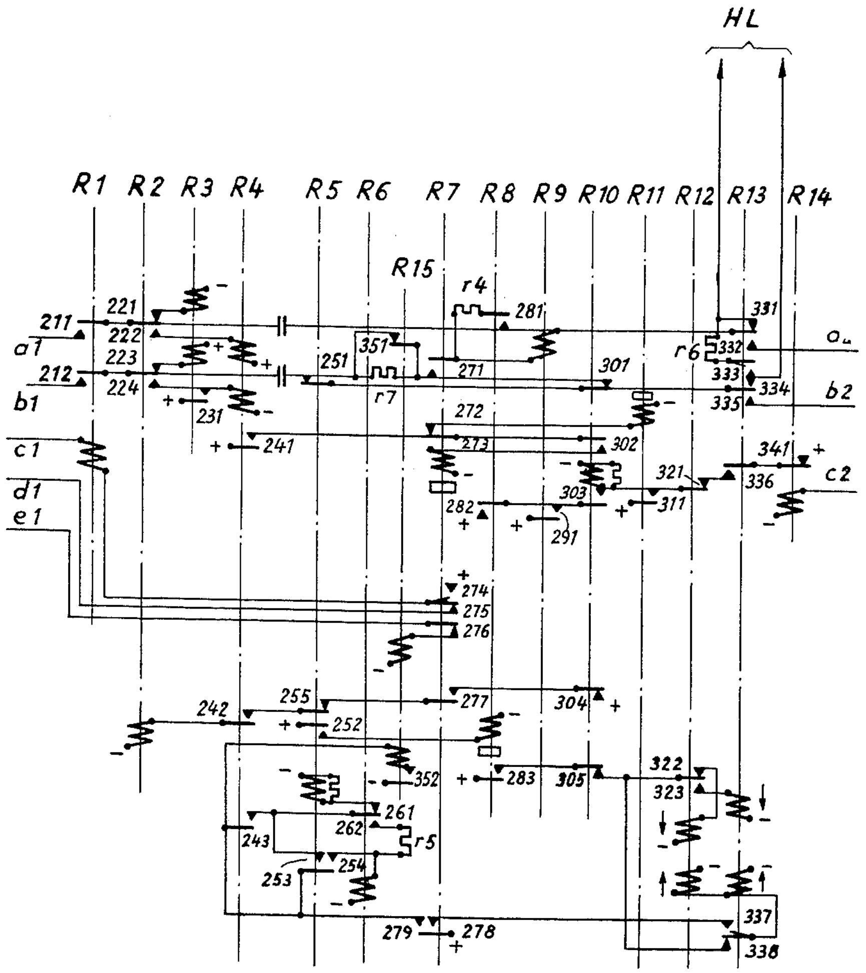
FIG. 2 shows a main line HL with its pertaining relay set.

If a call is directed to the main exchange, the relay NR4 is operated from the registering device RM, when the register has set the marker M. The contacts 41—44 are actuated. The marker selects a free main line HL by means of a circuit over the wire *e*1, the contact 276 and the upper winding of the relay R15. The selector GV pertaining to the main line HL is started by means of the driving magnet GM and hunts for the relay set SR, NR1—NR4, a testing relay pertaining to the marker being operated in a circuit over the wire *d*1, the contact 275, the winding on the relay R1, the wire *c*1, the wiper in GV, the contact 43, the upper winding of the relay NR4, to minus. The selector GV stops and the relay R1 is operated. The contacts 211—212 are actuated. If the call comes from the instrument A1, RM will receive signals from the voice frequency receiver TM, which produces a separate signal to the marker M indicating that voice frequency signalling is used. This signal is conveyed to the relay R15 in the main line, which is operated. The contacts 351 and 352 are actuated in this case. At the same time a signal is sent from the marker M to the registering device RM, the contact 100 thereby being actuated and the register REG being released. The relay R3 in FIG. 2 is operated over the contacts 221 and 223, 211 and 212, the wires *a*1 and *b*1, GV, the contacts 11 and 13 SR, S, the wires *a* and *b* and the calling subscriber's instrument A1 or A2. The contact 231 is closed. The relay R4 is operated. The contacts 241—243 are closed. The relay R11, which is slow-releasing, is operated over the contacts 241 and 272. The contact 311 is closed and the relay R10 is operated. The contacts 301—305 are actuated. The relay R7, which is a slow-releasing holding relay, becomes energized over the contacts 241 and 302 and is operated. The contacts 271—279 are actuated. The current through the relay R11 is interrupted by the contact 272.

During the release time of the relay R11 the following process takes place. The relay R5 is operated in a circuit over the contacts 279, 243 and 261. The contacts 251—255 are actuated. The relay R6 is operated over the contacts 279 and 254 and the relay R8, which is quick in operation but slow releasing, is operated over the contact 352. The contacts 261—262 and 281—283 are actuated. The current through the relay R5 is interrupted by the contact 261 and thus R5 releases its armature and a circuit is completed over the contact 331 and the winding on the relay R9, the contacts 271, 351 or the resistance *r*7, 251 and 334 from the main exchange HL. The relay R9 is operated and the contact 291 is closed. After R5 has released its armature, also the relay R8 will release, and then the relay R10 is kept energized over the contact 291. When the line loop over the main line HL is closed, the main exchange is called and when this is ready to receive signals there will be emitted a dialling tone from the main exchange to the calling subscriber's instrument A1 or A2.

If the call comes from the instrument A1, the relay R3 is kept energized through the rectifier E2. Voice frequency signals are emitted by means of the push buttons P0—P9 without interruptions of current in the subscriber's line. The relay R15 is operated and is kept energized through its lower winding over the contact 252.

If the call comes from the instrument A2, impulse series are sent by means of the dial of the instrument. The relay R15 is not operated. The impulses are repeated by the relays R3 and R4. The slow releasing holding relay R7 remains during the impulsing. At each interruption the relay R6 however releases, when the contact 243 is opened, and at each make the relay R5 will first be operated and then the relay R6, whereupon the relay R5 is again released and the relay R6 is held until the next interruption of current. The winding of the relay R5 is connected in parallel with a resistance and thus the relay will release with some delay and an impulse of determined duration will be achieved. This impulse is transmitted in the form of a current interruption in the contact 251 to the main exchange and in the form of a closing of the contact 252 to the relay R8. The relay R8 is operated at the beginning of each impulse train and remains through its slow release until the end of the impulse train. In order to facilitate the impulse transmission in the line HL there is connected a resistance $r4$ by the contact 281. The relay R10 is during the impulse sending kept energized over the contact 282 and is a little slow releasing due to a parallel resistance.

When the main exchange has received the necessary signals for the setting up of a connection or when an answer is obtained from the called subscriber, a signal will be sent from the main exchange over the main line HL. This signal may be a current interruption of short duration or a turning of the current bringing about that the relay R9 releases and the contact 291 breaks the current through the relay R10 for so long a time, that the relay R10 releases its armature. The contacts 301, 304 and 305 are closed and the relay R7 is kept energized over the contact 273. The relay R2 is operated over the contacts 242, 255, 277 and 304. The contacts 221—224 are actuated. The current direction in the subscriber's line is turned, which is of no importance for the instrument A2 but causes microphone feeding over the contact $k$ and the rectifier E1 in the instrument A1. The relay R4 is kept energized over the line loop while the relay R3 is released. At calls from the instrument A2 an impulse is sent from the dial, when a call-back extension is desired. The relays R4, R2 and R6 release. After the end of the impulse the relays R3, R4, R2, R5 and R6 are operated, whereupon the relays R3 and R5 are again released. An impulse is sent to the relay R8 and is repeated by the contact 283, the relay R13 being operated *in* the following circuit: +, the contacts 283, 305 and 338, the lower winding of the relay R13, to minus. At the same time the relay R12 becomes energized through both its windings, which, however, counteract each other so that this relay is not operated. The contacts 331—338 are actuated. The relay R10 is operated over the contacts 341, 336 and 321. The relay R9 becomes energized over the wires $a2$, $b2$ and the contacts 332, 271, 251 and 335 from line relays pertaining to the call-back line and keeps the contact 291 closed. The relay R2 releases, when the contact 304 operates. The relay R3 is operated and holds the relay R4. A short movement of the armature of the relay R4, when the contacts 221—224 change, is in this phase of the connection without effect. When the slow releasing relay R8 releases after the end of the impulse, the relay R13 is kept energized over the contacts 278 and 337 through its lower winding. The relay R12 is also operated over the contacts 278 and 337 through its lower winding. The contacts 321—323 are actuated.

As the line loop over the call-back line $a2$, $b2$ is closed, the telephone exchange is called. The subscribed receives a dialling tone from a register REG, dials the necessary digits on his dial and gets a communication with the called telephone instrument. As the relay R10 is again kept energized over the contacts 291, 282 and 303, the contact 305 is opened and impulses may be sent to the register REG as is described above. When the connection has been established and the register REG is released, the current direction is turned in the call-back line $a2$, $b2$, which appears from FIG. 1 by the fact that the relay RE2 is changed for the relay NR2 and the relay NR1 is operated at local connections within the telephone exchange. The relay R9 then releases and the contact 291 opens so that the relay R10 releases its armature. The relay R2 is again operated and the current direction in the subscriber's line is turned.

After the inquiry has been made and the subscriber wishes a new connection with the main line HL, an impulse is again sent by means of the dial. The relay R8 repeats and prolongs the impulse. The relay R13 becomes energized through both its windings, which counteract each other so that the relay releases its armature. The relay R12 is however held, first in the circuit over the contacts 278 and 337, and then in the circuit over the contacts 283, 305 and 338 through the lower winding of the relay. After the end of the impulse the relay R8 releases, the holding circuit through the lower winding of the relay R12 being broken and the relay releasing its armature. The communication with the main line HL over the contacts 331 and 334 is thus restored.

The switching operation at a call-back is substantially the same as has been described above, when a subscriber's instrument A1 provided with a voice frequency sender is connected to the main line. The call-back is started by the push button being pushed dow, the break contact $k$ thereby being actuated and the current being broken over the subscriber's line $a$, $b$ through the rectifier E1. The relay R4 releases and the contact 242 interrupts the current through the relay R2, which also releases. The current direction in the subscriber's line is reversed and the relay R3 is operated in series with the rectifier E2 in the instrument A1. The contact 231 is closed and the relay R4 is again operated. Hereby an impulse has been repeated by the contact 243 and the same process takes place as has been described above for an impulse from a dial. The relay R5 is operated more quickly than the relay R2 and holds the contact 255 opened until the relay R10 has been operated. The current direction through the rectifier E2 is then maintained as long as a register REG is connected to the call-back line $a2$, $b2$. As the resistance $r7$ is now connected to the line loop, the voice frequency receiver TM will be connected to the register REG instead of the impulse receiver IM. When the register REG has been disconnected, the current direction in the call-back line $a2$, $b2$ is reversed, the relay R10 releases and the resistance $r7$ is short-circuited by the contact 301.

The signal for call-back produced at calls from the instrument A1 to the main exchange by means of the break contact $k$, the rectifier E2 and the relays R2, R3, R4 will thus be, as appears from the description, equivalent to a time determined interruption of current, in spite of the fact that the push buttor P0 may be pushed down for an arbitrarily long time. The voice frequency signals from the instrument A1 are heavily damped oscillations, which have time to be damped out before the register REG has been connected and the voice frequency receiver T$m$ is ready to receive numerical signals.

According to the description above the contact $k$ is controlled in the subscriber's instrument A1 according to FIG. 1 only by means of the push button P0, which is also used for the sending of the digit 0. If the last digit, which is received by the register REG, is zero and the calling person holds the button P0 pushed down for so long a time that the register has time to be released, the relay NR2 will not be operated and the communication set up by the register is immediately disconnected. In order to prevent this the break contact $k$ is suitably controlled by means of two push buttons, e.g. P0 and P9, which are to be pushed down simultaneously at a call-back. This is achieved according to FIG. 1 by means of two break contacts $k$ and $q$ connected in parallel, the contact $k$ being controlled by P0 and the contact $q$ by P9. Only when the contacts $k$ and $q$ are actuated simultaneously there will be obtained a break of the circuit through the rectifier E1 and the microphone M.

We claim:

1. In a private automatic branch exchange, in combination, a plurality of subscriber lines, a plurality of subscriber instruments connected respectively to each of said subscriber lines, at least one main line adapted to be connected to each of said subscriber lines for connecting said instruments to a main exchange, each of said instruments including a key set, means energizably connected to said key set for generating digit signals in said subscriber lines, and microphone circuit means and holding circuit means, said key set including keys, said microphone means including a microphone, a break circuit energizably connected to one of said keys, and rectifier means for transmitting current in one direction in said subscriber line, said holding circuit means including rectifier means for transmitting current in another direction in said subscriber lines, exchange means to connect each one of subscriber lines to said main line including a separate line in said main line terminating at said branch exchange and relay means in said main line for coupling signals to each of said subscriber lines, a switching relay in said main line to connect each of said subscriber lines thereto and controlling the direction of current flowing therein, and switching means in said main line for connecting each one of said current-direction controlled subscriber lines alternately to said main line and to each of said separate lines, said relay means being responsive to current flowing in said microphone circuit during voice-frequency communication, said one of said keys being adapted to actuate said break circuit during voice-frequency communication, said relay means and said switching means being responsive to said actuated break circuit for changing the direction of current flowing in one of said subscriber lines and for connecting said current-direction controlled subscriber line to one of said separate lines, said key set and generating means being connected for generating signals in said separate line connected to said current-direction controlled subscriber line, said last-named separate line being connected to said exchange branch through said holding circuit.

2. An automatic branch exchange according to claim 1 wherein said break circuit includes at least two contacts energizably connected to at least two keys of said key set, said break contacts being connected in parallel in said microphone circuit means, the simultaneous actuation of said two keys actuating said relay means.

3. In a private automatic branch exchange, in combination, a plurality of subscriber lines, a plurality of subscriber instruments connected respectively to each of said subscriber lines, at least one main line adapted to be connected to each of said subscriber lines for connecting said instruments to a main exchange, each of said instruments including a key set, means energizably connected to said key set for generating digit signals in said subscriber lines, and a microphone circuit and a holding circuit connected respectively to said subscriber line, said key set including manually-actuated keys, said microphone circuit including a microphone, a break contact engageable by one of said keys, and a first rectifier transmitting current through said subscriber line in one direction, said holding circuit including a resistance and a second rectifier transmitting current in another direction in said subscriber line, exchange means to connect each one of said subscriber lines to said main line including a separate line in said main line terminating at said branch exchange and relay means in said main line for coupling signals to each of said subscriber lines, a switching relay in said main line to connect each subscriber line for current flow in said two directions separately, and switching means in said main line for connecting each of said current-direction controlled subscriber lines alternately to said main line and to each of said separate lines, said relay means including a feed relay energized during voice-frequency communication by current in said microphone circuit, said one of said keys being adapted to actuate said break contact during voice-frequency communication, said feed relay being de-energized and said switching relay being energized by said actuated break contact, whereby current flowing in said subscriber line is changed and said current-direction controlled subscriber line is connected to one of said separate lines, said last-named separate line being connected to said branch exchange through said holding circuit, said key set and said generating means being connected for generating signals.

References Cited in the file of this patent

UNITED STATES PATENTS

| | | |
|---|---|---|
| 2,405,211 | Hartley | Aug. 6, 1946 |
| 2,438,496 | Deakin | Mar. 30, 1948 |
| 2,554,201 | Lundkvist | May 22, 1951 |
| 2,697,749 | Jeanne et al. | Dec. 21, 1954 |
| 2,713,617 | Dunlap | July 19, 1955 |
| 2,885,483 | Faulkner | May 5, 1959 |